April 11, 1944.  C. H. DESAUTELS  2,346,475
MACHINE FOR WRAPPING TOROIDAL OBJECTS
Filed Jan. 17, 1941  3 Sheets-Sheet 1

INVENTOR.
CHARLES HENRY DESAUTELS
BY
ATTORNEY

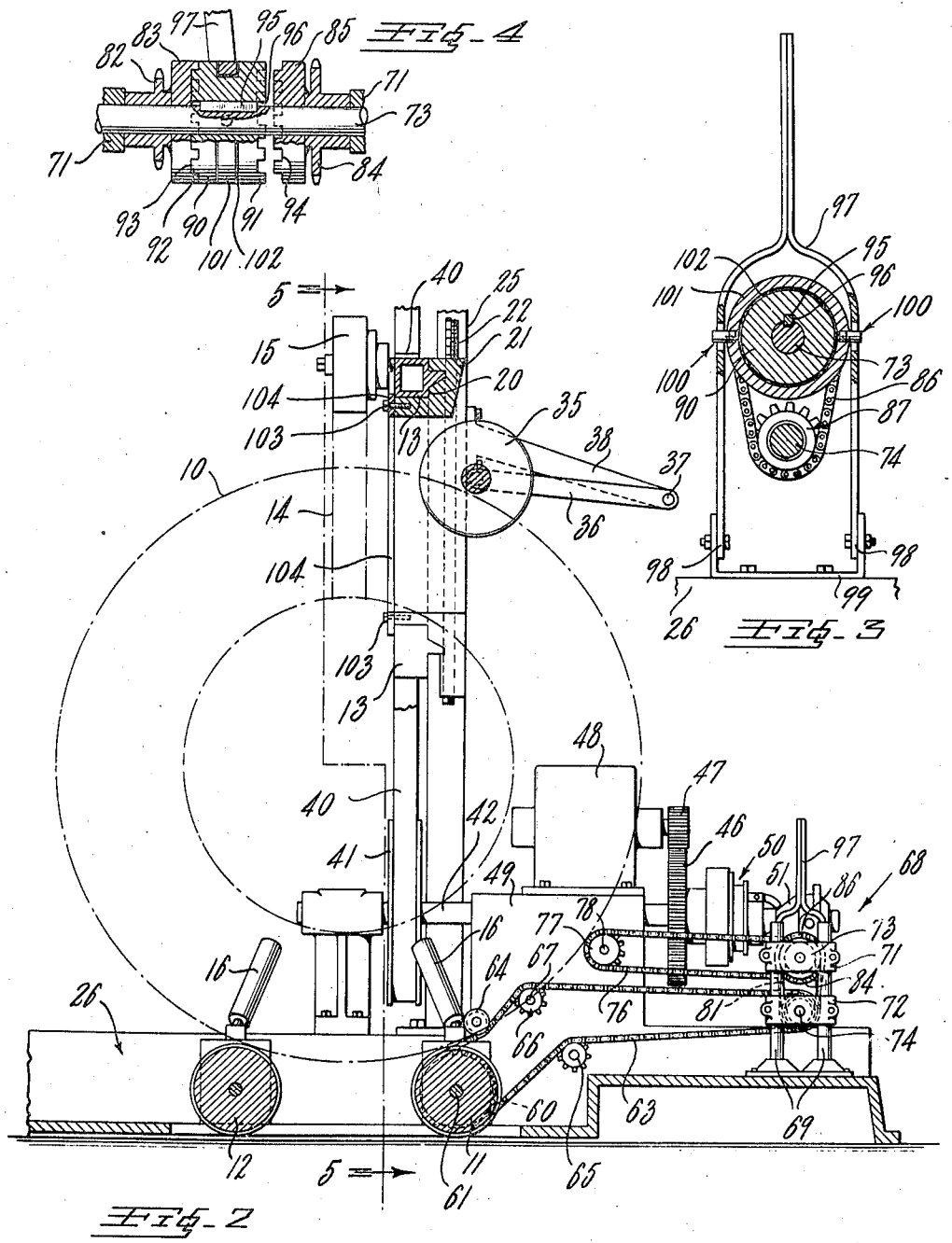

Patented Apr. 11, 1944

2,346,475

UNITED STATES PATENT OFFICE 2,346,475

MACHINE FOR WRAPPING TOROIDAL OBJECTS

Charles Henry Desautels, Springfield, Mass., assignor to United States Rubber Company, New York, N. Y., a corporation of New Jersey Application January 17, 1941, Serial No. 374,828

3 Claims. (Cl. 242—6)

This invention relates to the wrapping of toroidal articles such as tire casings, and has for its main object to provide improvements in the type of machine disclosed in the Schoij Patent No. 1,824,374, whereby the speed at which a tire passing through the paper applying shuttle may be easily changed to accommodate the wrapping of different widths of paper or where it is desired to vary the amount of overlap for a given width of paper.

Heretofore in wrapping machines of the type referred to it has not been possible without considerable loss of time to change the rotational speed of the tire relatively to the speed of the paper shuttle. Such change from one speed to another required the services of a machinist to remove certain of the drive sprockets for the substitution of others to provide a different ratio of teeth, and also the insertion or removal of chain links in the drive chain in order to change its length. These alterations had to be made every time a change was required in the width of the paper or the amount of overlap to be made in the wrapping. Obviously, under these conditions the productive capacity of the machine was materially reduced.

According to the present improvements, the only change of parts required is that of substituting one of the rotary shuttles for another shuttle carrying a different width of paper. This change may be made quickly by the wrapping machine operator with an ordinary socket wrench, and involves only the removal and replacement of a retaining ring which normally holds the shuttle in its runway. The change in speed relation between the tire and the shuttle requires no demounting or interchange of parts but is accomplished by means of a simple speed change mechanism under the control of the operator.

Various other objects and advantages of the invention will appear as the description proceeds, reference being made to the accompanying drawings, in which—

Figure 1:
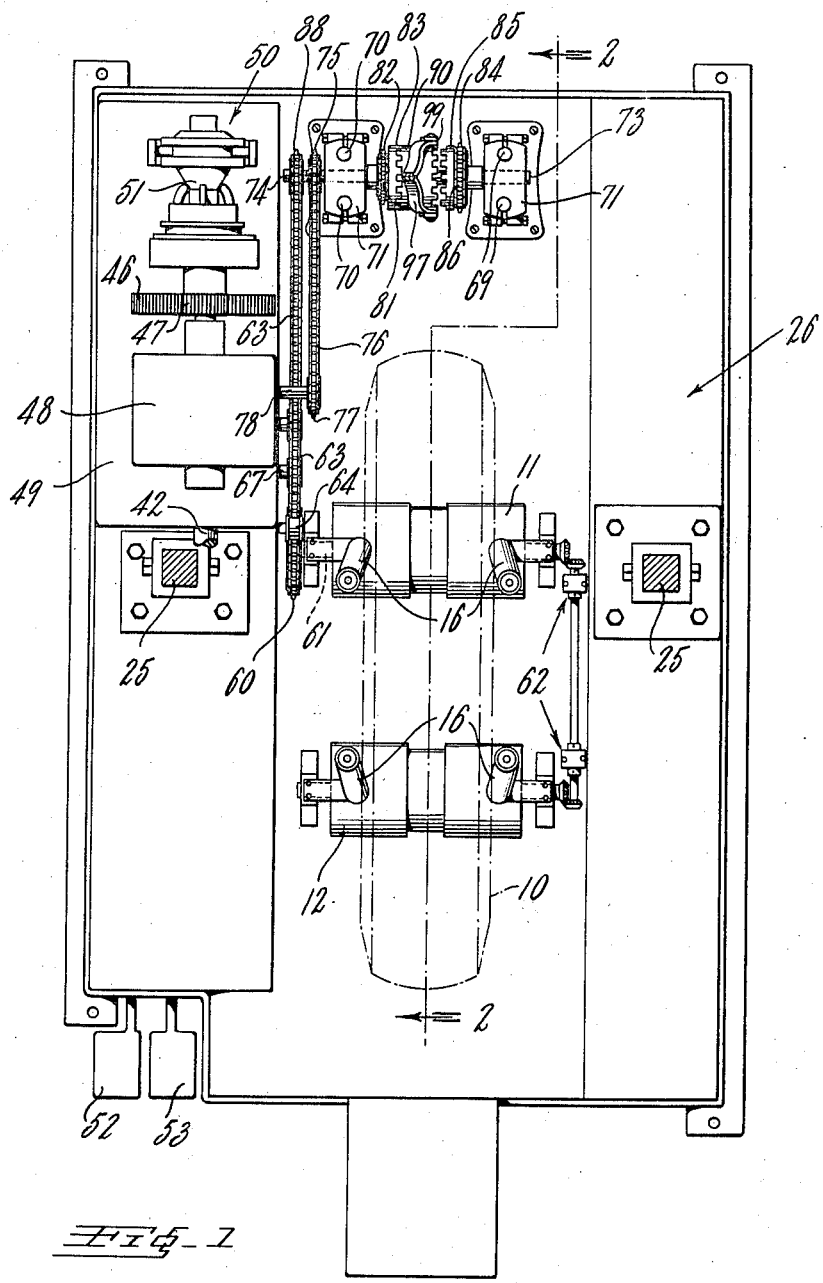
Figure 5:
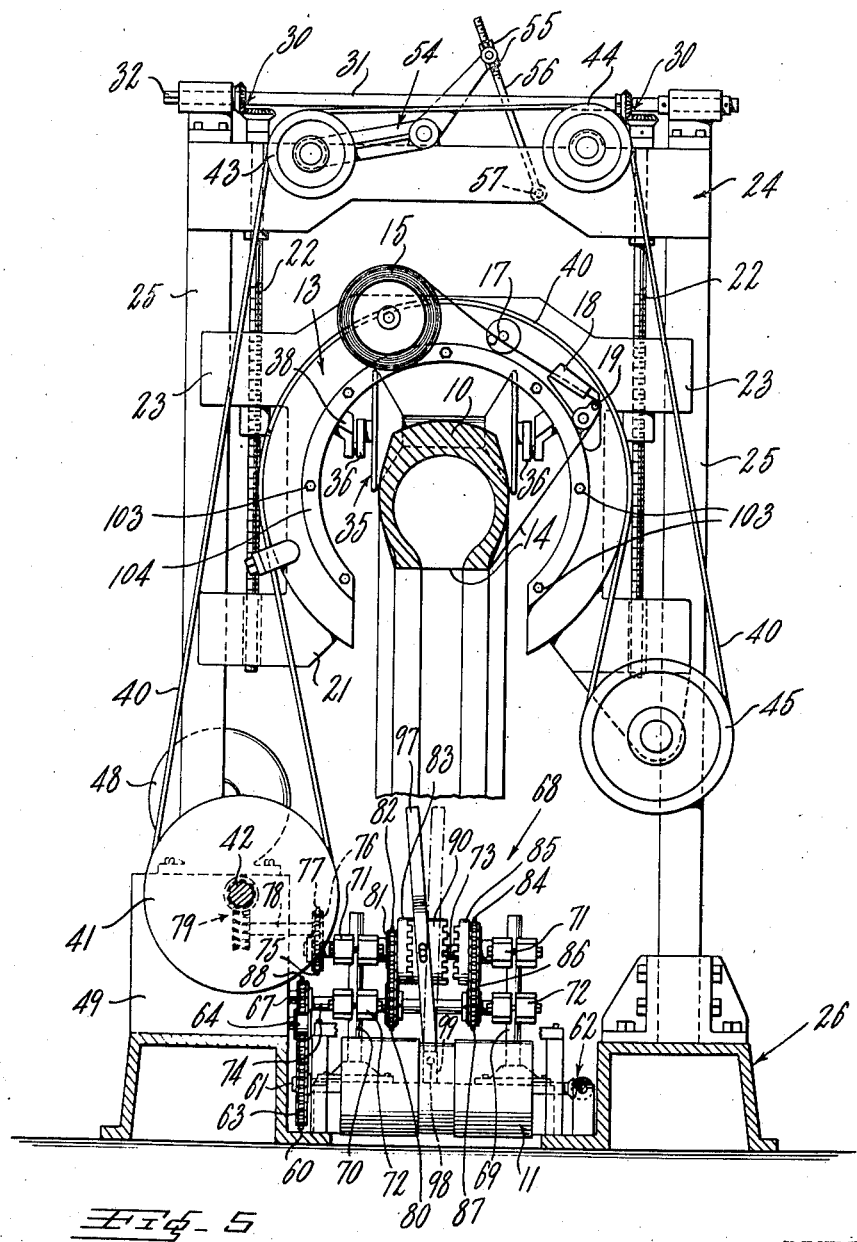

Fig. 1 is a plan view of a tire wrapping machine embodying the invention, with parts of the upper portion of the machine cut off in section to facilitate illustration of the present improvements;

Fig. 2 a vertical section of a portion of the machine on the line 2—2 of Fig. 1;

Figs. 3 and 4 are details of a clutch mechanism with parts broken away in section; and Fig. 5 a vertical section of the machine on the line 5—5 of Fig. 2, with parts broken away.

In the drawings which illustrate one practical form of the invention, the reference numeral 10 indicates a tire casing having a tread portion adapted to rest on a pair of rollers 11 and 12 located substantially at floor level to facilitate rolling the tire into position thereon without lifting. These rollers impart motion to the casing about its axis of rotation whereby the casing is moved at a predetermined rate of speed through a revolving open gap shuttle 13 to receive a wrapping of paper 14 from a roll 15 carried around by the shuttle. Pairs of slanting guide rollers 16 keep the tire casing centered in the machine. A tension device 17, an edge folder 18, and an edge gumming nozzle 19, the purposes of which are well known are also carried by the shuttle 13 and are removable therewith as a unit for replacement by another shuttle unit provided with wrapping paper of a different width, enabling quick changes of shuttles for different widths of paper.

According to the usual practice the shuttle is mounted in a runway 20 (Fig. 2) provided in a frame 21 which may be elevated or lowered by means of vertical adjusting rods 22 to adjust the height of shuttle for tires having different wheel diameters. The rods 22 are threaded through extensions 23 of the frame 21, the upper ends of the rods 22 being mounted in an overhead frame 24 supported on upright members 25 secured to the bedplate 26 of the machine and providing guides for the shuttle frame. The threaded adjusting rods 22 may be provided with bevel gear connections 30 for simultaneous operation by a turnable cross rod 31 which may be squared at one end 32 for the application of a suitable tool to adjust the height of the shuttle carrying frame 21.

A double cone shaped roller 35 acting as a top guide for the tire casing 10 is mounted on arms 36 pivoted at 37 to brackets 38 secured to the frame 21.

The shuttle is driven by an endless belt 40 driven by a pulley 41 mounted on a shaft 42 the belt passing around the shuttle 13 and thence over idlers 43, 44 and 45. Power is applied to the shaft 42 of the pulley 41 through the medium of a reduction gear 46 meshing with a pinion 47 driven by the motor 48, which latter is mounted on a housing 49 associated with the bedplate 26. The connection of the gear 46 to the shaft 42 is made through a clutch 50 operated by a cone 51 (Fig. 1) under the control of any suitable means such as a lever (not shown) or by means of suitable start and stop treadles (not shown). Suitable brake mechanisms under the control of the start and stop treadles are provided for releasing and applying brakes (not shown) on the pulley 41 and the shuttle 13 to allow same to run freely and to stop same when the respective treadles are operated to start and stop the machine. The particular construction of the brakes, and the connection between the brakes, and the clutch 50 and the treadles 52 and 53 are not shown since they are well known in the art and are also described in the Schoij patent referred to above.

The idler 43 is movable to loosen or tighten the belt 40 and to restore the desired tension on the belt after the height of the shuttle 13 has been adjusted. The idler 43 is supported on a pivoted arm 54, the end of which is movable so as to adjust the idler 43 by means of the nuts 55 on the threaded rod 56, the latter being pivoted to the cross frame 24 at 57.

The rollers 11 and 12 for rotating the tire casing 10 through the opening of the paper shuttle 13 are driven by a sprocket 60 on the shaft 61 of the roller 11, there being a bevel gear connection as indicated at 62, or any other suitable form of driving means between the rollers 11 and 12 for turning them in unison in the same direction and at the same rate of speed. A drive chain 63 in mesh with the sprocket 60 passes under a chain tightening roller 64 and is in mesh with an idler sprocket 65 and another similar sprocket 66 fixed to a stub shaft 67 which may be utilized for driving a recording meter or other counting device (not shown). The chain 63 is driven by the motor 48 through the control of a change speed clutch mechanism 68 to vary the ratio between the speed of tire casing 10 and the paper applying shuttle 13, in a manner now to be described.

Mounted on the back end of the bedplate 26 are two pairs of vertical rods 69 and 70 (Fig. 5) which support upper and lower adjustable bearing blocks 71 and 72 respectively carrying the upper countershaft 73 and the lower secondary shaft 74. Fixed to one end of the upper shaft 73 is a sprocket 75 driven by a chain connection 76 from a sprocket 77 secured to a drive shaft 78 which in turn is driven by a worm gear connection 79 or other suitable driving means from the shaft 42.

In the present example of the invention an 18 tooth sprocket 80 fixed on the lower secondary shaft 74 is connected by a chain 81 to a combined 18 tooth sprocket 82 and clutch member 83 freely rotatable on the upper countershaft 73, the sprocket 82 and the clutch member 83 being rigidly secured together as a unit or made in one piece. A similarly combined 23 tooth sprocket 84 and clutch member 85 freely rotatable on the upper shaft 73 are connected by a chain 86 to a 16 tooth sprocket 87 fixed to the lower shaft 74. A sprocket 88 on the end of the lower shaft 74 drives the chain 63 to impart rotation to the tire supporting rollers 11 and 12 when power is delivered to the lower shaft 74.

For operating the clutch members 83 and 85, selectively, to rotate the respective sprockets 82 and 84 there is provided a slidable double jaw clutch element 90 having oppositely disposed teeth 91 and 92 adapted to be engaged by complemental teeth recesses 93 and 94 of the clutch members 83 and 85. The double jaw clutch element 90 is slidably secured to the upper shaft 73 by a key 95 disposed in a keyway 96, and is movable into engagement with either one of the two clutch members 83 and 85 by means of a yoke-shaped lever 97 pivoted at its lower ends 98 to a bracket 99 fixed to the bedplate 26 and having pin-and-slot connections 100 with a ring 101 which is mounted freely in an annular slot 102 of the clutch element 90.

It is apparent that the gear ratio between the drive operated by the chains 81 and 86 may be changed to obtain the desired results, and from the foregoing construction that a swing of the lever 97 to shift the clutch element 90 into engagement with the teeth of the clutch member 83 will result in driving the chain 63 through the medium of the two 18 tooth sprockets 80 and 82 and their chain connection 81, thereby imparting rotation to the tire supporting rollers 11 and 12 at a comparatively slow rate of speed compared to the speed of the paper shuttle 13. The above driving connection drives the tire at the proper speed for the shuttle to spirally wrap a selected width of paper (referred to as the narrow strip) around the annulus of the tire with a predetermined overlap, or to wrap a wider strip of paper with a greater overlap.

If it is desired to wrap the wider strip of paper with less overlap than above, the lever 97 is shifted to cause engagement of the teeth of the clutch element 90 with those of the second clutch member 85. This brings the 23 tooth sprocket 84 into action to drive the 16 tooth sprocket 87 of the lower shaft 74, resulting in an increase in the speed of the rollers 11 and 12 with respect to the rotational speed of the shuttle 13 which has remained unchanged due to its unaltered driving connection with the motor 48. Under this new speed ratio, the tire casing passes through the paper shuttle 13 at a higher rate of speed than in the previous case and may receive a wrapping of wider paper, or a wrapping of a given width size of paper with less overlap.

A change from one width of paper to another is generally made by changing the shuttles according to well known practice, and involves nothing more than removal and replacement of the screws 103 and the retaining ring 104 which normally hold the shuttle in its runway.

It is apparent that considerable time is saved in making the change from one speed to another for driving the tire rotating rolls 11 and 12, enabling all of the work above enumerated to be accomplished quickly on a single machine.

Furthermore, it is to be understood that the foregoing description is merely illustrative of one practical form of the invention, and that the same may be embodied in many variations and alterations of the present described construction without departing from the spirit and scope of the appended claims.

Having thus described my invention, what I claim and desire to protect by Letters Patent is:

1. In a machine for wrapping a toroidal object, the combination of a vertically adjustable rotary wrapping strip applying shuttle, a motor, a driving connection between the motor and the shuttle, rollers for supporting said object, means operated by the motor for rotating said rollers to revolve the object in the path of the shuttle, said means including a counter shaft, a driving connection between the counter shaft and the motor, a secondary shaft, two independently operable driving connections between the counter shaft and the secondary shaft, said independent driving connections being adapted to provide two different speed ratios between said rollers and the shuttle, and a two speed quick change clutch mechanism associated with said two independent driving connections for selectively putting either one of them into operation to transfer power from the motor to said rollers, said clutch mechanism comprising two clutch members freely rotatable on said counter shaft, one of said clutch members being secured to one of said driving connections, the second clutch member being secured to the other driving connection, and a controlling clutch element mounted on and slidably connected in driving relation to said counter shaft between the two clutch members, the latter and said clutch element being provided with means whereby said clutch element may be selectively connected to drive either of said clutch members or be disengaged therefrom.

2. In a machine for wrapping a toroidal object, the combination of a vertically adjustable rotary wrapping strip applying shuttle, a motor, a driving connection between the motor and the shuttle, rollers secured adjacent the floor level of the machine, whereby without lifting the object it may be easily rolled into position to rest on the rollers, means operated by the motor for rotating said rollers to revolve the object in the path of the shuttle, said means including a counter shaft, a driving connection between the counter shaft and the motor, a secondary shaft, two independently operable driving connections between the counter shaft and the secondary shaft, said independent driving connections being adapted to provide two different speed ratios between said rollers and the shuttle, and a two speed quick change clutch mechanism associated with said two independent driving connections for selectively putting either one of them into operation to transfer power from the motor to said rollers, said clutch mechanism comprising two clutch members freely rotatable on said counter shaft, one of said clutch members being secured to one of said driving connections, the second clutch member being secured to the other driving connection, and a controlling clutch element mounted on and slidably connected in driving relation to said counter shaft between the two clutch members, the latter and said clutch element being provided with means whereby said clutch element may be selectively connected to drive either of said clutch members or to be disengaged therefrom.

3. In a machine for wrapping a toroidal object, the combination of a vertically adjustable rotary wrapping strip applying shuttle, a motor, a driving connection between the motor and the shuttle, rollers for supporting and rotating the object in the path of the shuttle, said rollers being secured adjacent the floor level of the machine, a counter shaft, a chain drive connection between the counter shaft and the motor, a secondary shaft, two independently operable sprocket and chain driving connections between the counter shaft and the secondary shaft, chain and sprocket connections between the secondary shaft and the rollers, said independent driving connections being operable selectively to impart two different speeds to the object rotating rollers while the speed of the shuttle remains unchanged, and a two way quick change clutch mechanism for controlling actuation of said independent driving connections, said clutch mechanism comprising two clutch members freely rotatable on said counter shaft, one of said clutch members being secured to one of the independently operable sprockets, the second clutch member being secured to the other independently operable sprocket, and a controlling clutch element mounted on and slidably keyed to said counter shaft between the two clutch members, the latter and said clutch element being provided with interengageable portions whereby said clutch element may be put into driving relation with either of said clutch members or disengaged therefrom.

CHARLES HENRY DESAUTELS.